(12) United States Patent  
Elliott

(10) Patent No.: US 6,606,962 B2
(45) Date of Patent: Aug. 19, 2003

(54) HORSE FEEDER

(76) Inventor: Richard Elliott, 568 Deersprings Rd., San Marcos, CA (US) 92069-9516

( * ) Notice: Subject to any disclaimer, the term of this patent is extended or adjusted under 35 U.S.C. 154(b) by 0 days.

(21) Appl. No.: 09/933,687

(22) Filed: Aug. 20, 2001

(65) Prior Publication Data

US 2003/0033987 A1 Feb. 20, 2003

(51) Int. Cl.[7] .................................................. A01K 5/01
(52) U.S. Cl. ............................ 119/62; 119/65; 119/60; 119/68
(58) Field of Search ................. 119/62, 65, 66, 119/67, 68, 69, 63, 60, 58, 61, 51.01, 464, 467, 475, 477; D30/121

(56) References Cited

U.S. PATENT DOCUMENTS

| 247,346 | A | * | 9/1881 | Hendrick | 119/58 |
|---|---|---|---|---|---|
| 611,999 | A | * | 10/1898 | Huston | 119/60 |
| 884,436 | A | * | 4/1908 | Warren | 119/60 |
| 988,599 | A | * | 4/1911 | Shaw | 119/60 |
| 1,144,936 | A | * | 6/1915 | Gallinger | 119/68 |
| 1,216,203 | A | * | 2/1917 | Bower | 119/60 |
| 1,254,466 | A | * | 1/1918 | Bishop | 119/67 |
| 1,269,827 | A | * | 6/1918 | Lewis et al. | 119/58 |
| 1,462,893 | A | * | 7/1923 | Wingrove | 119/60 |
| 1,553,834 | A | * | 9/1925 | Peterson | 119/60 |
| 1,592,492 | A | * | 7/1926 | Kelly | 119/60 |
| 3,362,382 | A | * | 1/1968 | Frasier | 119/58 |
| D232,313 | S | | 8/1974 | Whitty | |
| 3,853,096 | A | * | 12/1974 | Whitty | 119/475 |
| D262,746 | S | | 1/1982 | Harris | |
| 4,401,056 | A | * | 8/1983 | Cody et al. | 119/477 |
| D271,433 | S | * | 11/1983 | Holland | D30/121 |
| 4,457,264 | A | | 7/1984 | Maier | |
| 4,488,510 | A | | 12/1984 | Lundgren | |
| 4,488,565 | A | * | 12/1984 | Smith | 119/60 |
| 4,580,528 | A | * | 4/1986 | Kendall | 119/53 |
| D287,771 | S | | 1/1987 | Kimble | |
| 4,784,084 | A | * | 11/1988 | Kohguchi et al. | 119/475 |
| 4,976,222 | A | * | 12/1990 | Cooke | 119/60 |
| 5,000,122 | A | * | 3/1991 | Smith | 119/58 |
| D331,132 | S | | 11/1992 | Maddocks | |
| 5,188,060 | A | * | 2/1993 | Johnson | 119/51.03 |
| 5,189,985 | A | * | 3/1993 | Brady et al. | 119/51.03 |
| D341,448 | S | | 11/1993 | Herzenach | |
| 5,394,832 | A | | 3/1995 | Briley | |
| 5,509,377 | A | * | 4/1996 | Franklin | 119/60 |
| 5,555,842 | A | | 9/1996 | Chocola et al. | |
| 5,694,885 | A | * | 12/1997 | Deitrich et al. | 119/467 |
| 5,909,717 | A | | 6/1999 | Randall | |
| 6,209,489 | B1 | * | 4/2001 | Akins | 119/52.1 |

* cited by examiner

Primary Examiner—Yvonne Abbott
(74) Attorney, Agent, or Firm—Nathaniel Durrance

(57) ABSTRACT

A livestock feeder particularly suited as a horse feeder. This feeder has a grille on a front face and hangs on an outside of an enclosure with the front face resting on horizontal bars of the enclosure. The animal is able to pull feed through the vertically disposed grille on the front face. With the feeder on the outside of the enclosure, it is easily accessible for cleaning, filling with feed, or relocation while providing safe access on the outside of the enclosure.

The feeder also allows a horse to eat at a natural gazing position by having a lower portion of the grille located near the ground. By providing feed at a natural grazing position, the feeder prevents gorging, boredom and waste while allowing the horse to feed with its head lower than its heart.

22 Claims, 9 Drawing Sheets

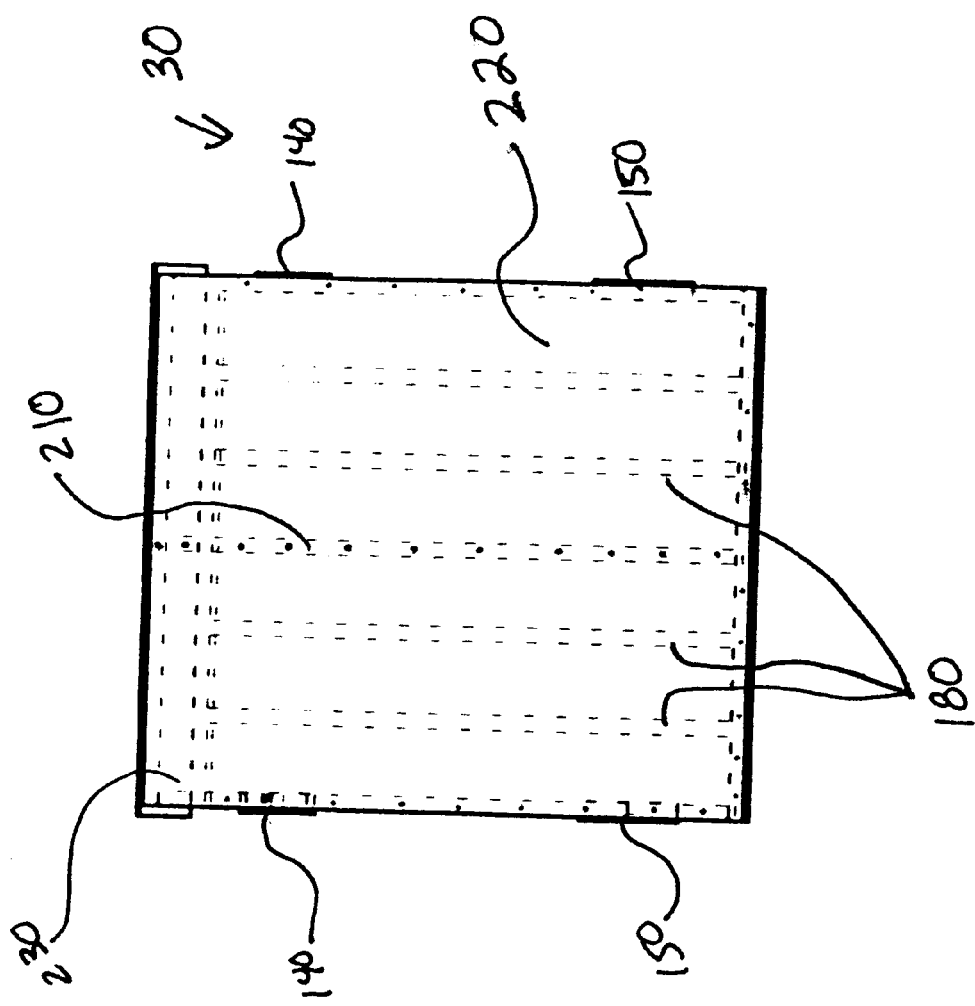

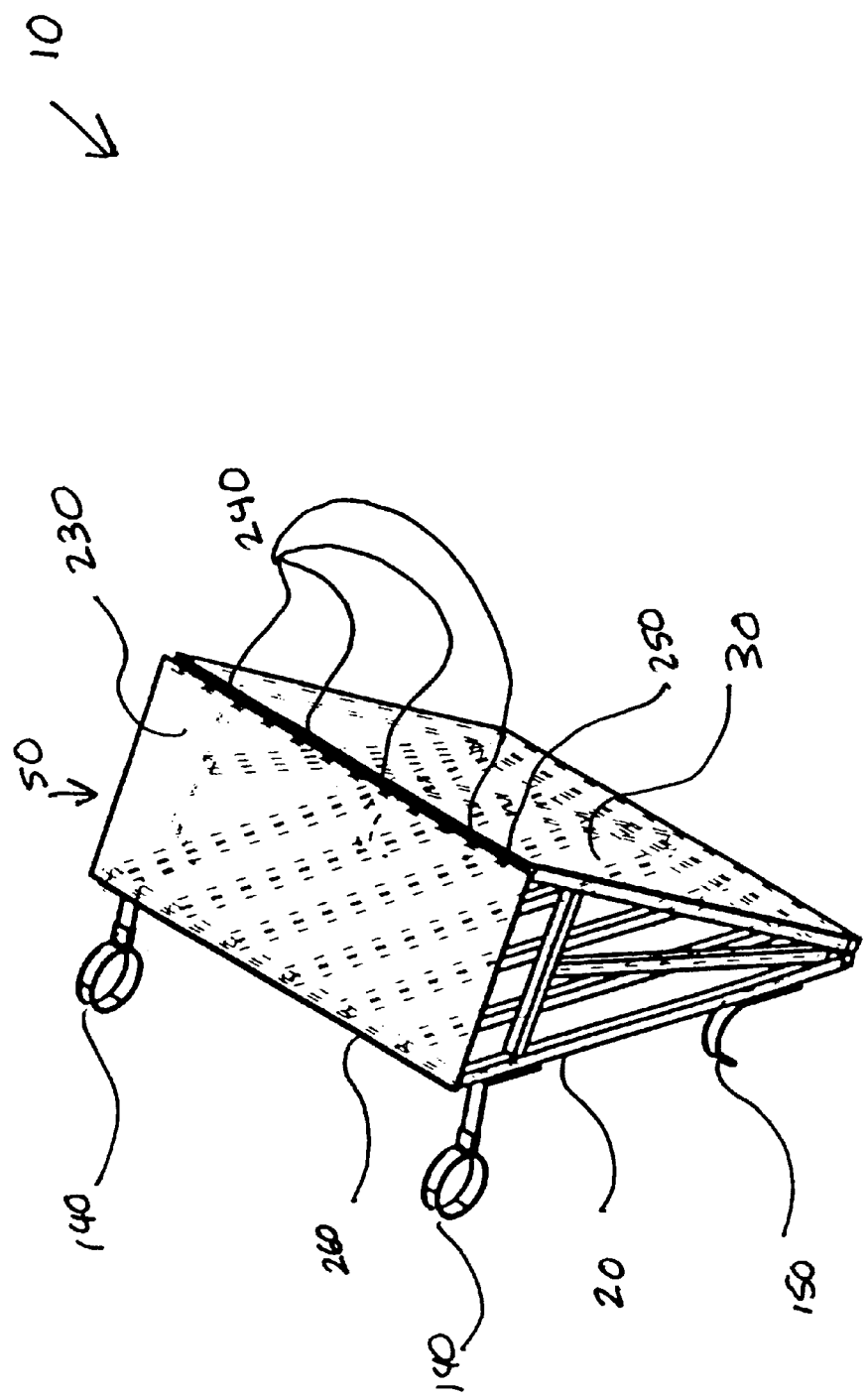

HORSE FEEDER

BACKGROUND OF THE INVENTION

This invention relates to feeders for livestock. Specifically, this invention relates to livestock feeders for use in feeding various types of fibrous feeds, such as hay. The invention is particularly suited for use as a horse feeder.

Feeders are well known in the art and are especially useful since they provide a method to monitor and regulate the amount of feed supplied and consumed by an animal. This control of the food supply is especially important for horses since they can consume great quantities of food in a short period of time which can result in a life threatening condition known as colic.

However, most prior art feeders do not allow a horse to eat in a natural grazing position. A typical prior art feeder includes a basin with a grille for holding hay, where the grille slopes downward and away from the horse from top to bottom. Because of this configuration, these feeders are usually located three to four feet above the ground so that the horse can access the feed. Unfortunately, this configuration results in the horse eating in an unnatural position with its head up at the grille of the feeder.

Also, these prior art feeders are usually permanently mounted on an inside of the animal's corral or enclosure. These types of permanently mounted feeders have many drawbacks since they are difficult to clean or relocate because they cannot be easily removed from the enclosure. But even if these feeders were not permanently mounted, they are still difficult to access, relocate and fill with feed since they are located within the animal's enclosure. This difficulty comes from the need to enter the enclosure to gain full access to the feeder.

BRIEF SUMMARY OF THE INVENTION

The present invention solves the problems of the prior art feeders by providing a feeder that attaches to an outside of an enclosure, is easily removable, and allows a horse to eat at a natural grazing position.

First, the present feeder is unlike any prior art feeder utilizing a grille since it is fastened to the outside of an animal's corral, enclosure or bin. By placing fastening mechanisms on a front face, the present feeder hangs on the outside of the enclosure with the front face resting on horizontal bars of the enclosure. The animal is able to pull feed through a vertically disposed grille on the front face. With the feeder on the outside of the enclosure, it is easily accessible for cleaning, filling with feed, or relocation.

Second, the present feeder is unlike any prior art feeder since it is easily removed, providing convenience for active horse people. The feeder attaches to the outside of the enclosure by two sets of fastening mechanisms. The first set is located on an upper portion of the front of the feeder and can be hooks or adjustable fasteners such as rounded fasteners that attach to the horizontal bars of the enclosure. Preferably, the first set of fasteners are adjustable rounded fasteners, each held together by a removable pin. This allows the upper portion of the feeder to be securely attached to the enclosure while providing simple removal since each fastener is held together by a single removable pin. Furthermore, since the upper and lower fasteners are adjustable, they can be adjusted to fit varying sizes of corrals and enclosures. In an embodiment, the first set of fasteners are also displaced from the front of the feeder by an elongated member such that the upper portion of the feeder is farther away from the enclosure than a bottom portion of the feeder.

The second set of fasteners attach to horizontal bars of the enclosure below the first set of fasteners. This second set of fasteners can be hooks or rounded fasteners. Preferably, the second set of fasteners are hooks.

By having a configuration of rounded fasteners on the upper portion with hooks located below, the feeder is easily removed by simply taking out the pins of the rounded fasteners and lifting the feeder off of the bars of the enclosure. Preferably all of the fasteners are made of metal or another material having strength and durability. Also, this configuration of fasteners is illustrative and it easily modified while keeping to the spirit of the present invention. For instance, more or less fastening mechanisms or bar attachments of different types placed at different locations may be used while still providing easy removal.

Finally, unlike any prior art feeder that attaches to the outside of an enclosure, the present feeder's novel design allows a horse to eat at a natural grazing position. By providing feed at a natural grazing position, the feeder prevents gorging, boredom and waste while allowing the horse to feed with its head lower than its heart. This type of feeding approximately doubles the length of eating time as compared to prior art feeders that do not allow the horse to eat in a natural grazing position.

Since horses are made to eat at a grazing position, the present feeder is beneficial to their health, including their digestion and salivation. At a natural grazing position, horses are more inclined to eat at a grazing pace similar to how they would eat while pasture grazing. This type of feeding is slow and constant. Thus, the horse does not gorge or become bored as they tend to do in the prior art feeders that force them to feed with their head above their heart.

With prior art feeders that force the horse to look up at a grille to eat, the horse, in its boredom, tends to pull the feed out of the feeder where it falls to the ground. Then the horse will eat the feed from the ground where they can eat at a natural grazing position. Feeding from the ground, however, results in poor feed utilization and waste while exposing the horse to sand colic and unsanitary conditions.

Therefore, by providing feed at a natural grazing position, the present feeder solves these problems of gorging, boredom, waste and unsanitary eating. The present feeder provides feed at a natural grazing position with a vertically disposed grille on a front face of the feeder where a bottom portion of the grille is located at or near ground level. The grille is made of vertical bars that are spaced apart such that feed can be pulled from in between the bars by a horse. Furthermore, the grille faces inside the enclosure where the feeder is attached outside the enclosure on horizontal bars that comprise the enclosure.

In a preferred embodiment, the feeder has a "V" shape where a front and back of the feeder slope away from each other from bottom to top. This "V" shape provides an opening at a top of the feeder where feed can be easily loaded. In a preferred embodiment, the top of the feeder comprises a lid whereby the top of the feeder can be closed.

The novel features of the present invention are disclosed is the following detailed description and referenced drawings. It is, however, only explanatory and is in no way intended to limit the scope of the invention.

BRIEF DESCRIPTION OF THE DRAWINGS

FIG. 8 is a back view of FIG. 1.

FIG. 9 is an isometric view of FIG. 1 from the top.

DETAILED DESCRIPTION OF THE INVENTION

Figure 1:
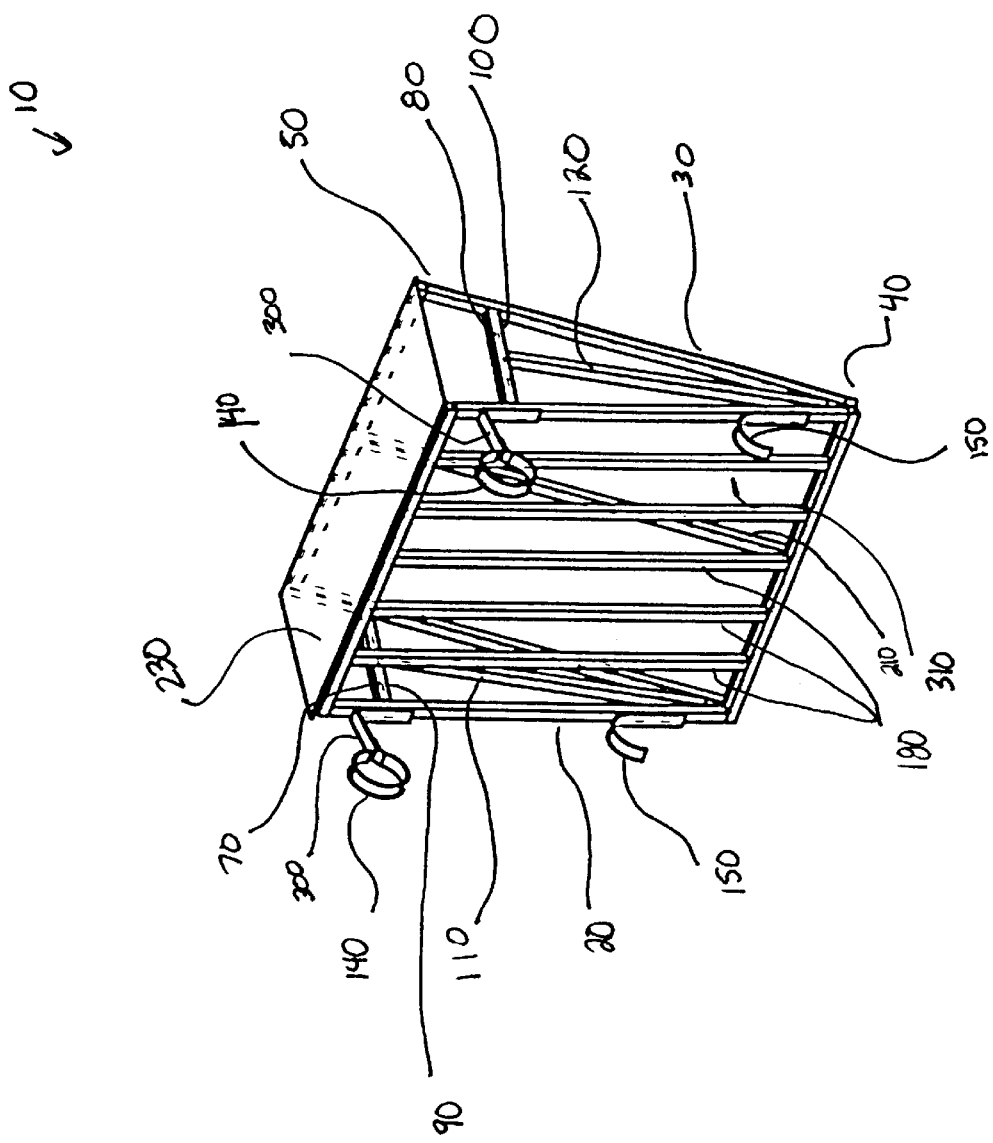
FIG. 1 is an isometric view of a preferred embodiment.
Figure 2:
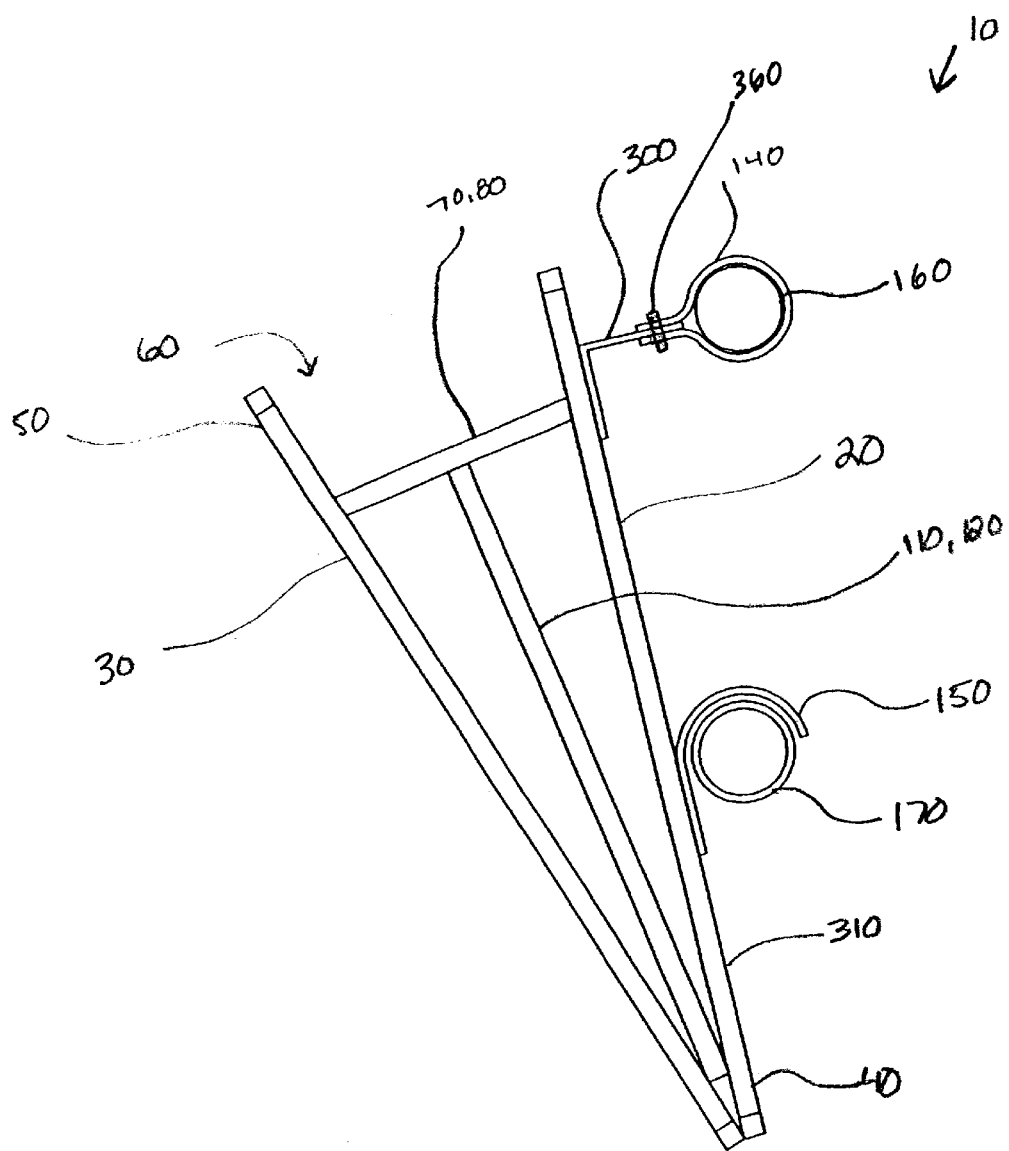
FIG. 2 is a side view of FIG. 1 without a lid covering.
Figure 3:
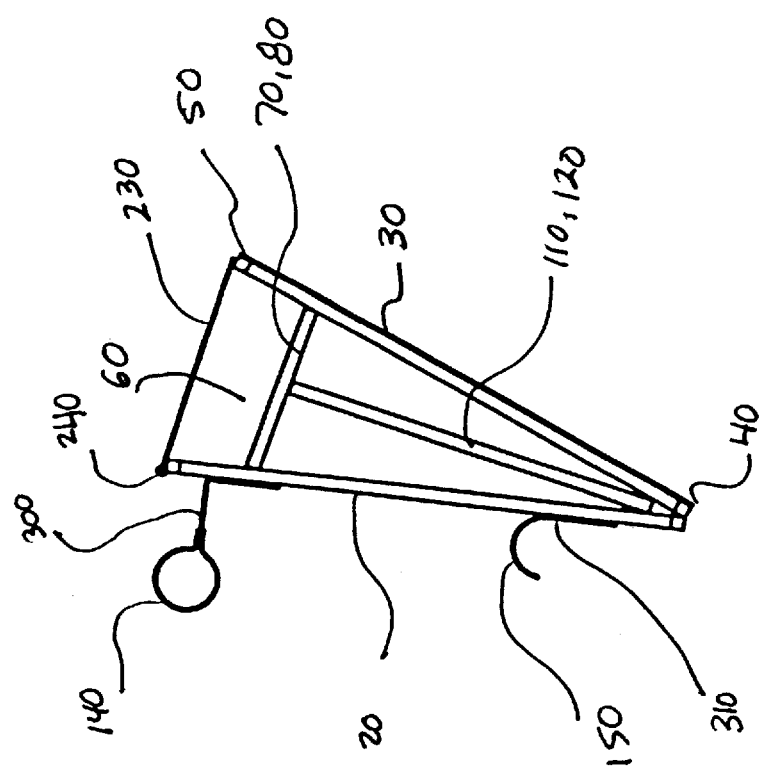
FIG. 3 is a side view of FIG. 1 with a lid covering.

Referring to FIG. 1, a preferred embodiment of the present invention is shown. Livestock feeder 10 comprises a front portion 20 and a back portion 30 where the front portion 20 and back portion 30 slope apart from each other to form a "V" shape. As shown in FIGS. 2 and 3, the front portion 20 and back portion 30 meet at a point of the "V" shape at a bottom end 40 and then diverge towards a top portion 50 of the feeder 10 so as to create an opening 60 at the top portion 50. Through this top portion 50 feed material is inserted into the feeder 10 and funneled in a downward direction to the bottom end 40.

Referring to FIG. 1, the front portion 20 and back portion 30 are structurally connected by horizontal members 70, 80 near the top portion 50 on an upper left portion 90 and upper right portion 100 of the feeder 10. Connected to the horizontal members 70, 80 on each side of the feeder 10 are vertically disposed members 110, 120. These vertical members 110, 120 travel from the horizontal members 70, 80 to the bottom end 40 and meet front portion 20 and back portion 30 at the point of the "V" shape. At the bottom end 40, the front portion 20 and back portion 30 meet and are structurally connected to a bottom portion of the vertical members 110, 120 by welding or some other type of connection. Alternatively, located at the bottom end 40 at the point of the "V" shape is a laterally disposed member (not shown) where the front portion 20, back portion 30 and vertical members 110, 120 meet and are structurally connected.

Connected to the front portion 20 are an upper and a lower set of fastening mechanisms 140, 150. The fastening mechanisms 140, 150 are spaced apart on the front portion 20 to connect to laterally disposed upper and lower corral enclosure bars 160, 170 of an enclosure. The upper set of fastening mechanisms 140 is connected near a top portion 50 of the feeder 10 and comprises two adjustable rounded metal fasteners that wrap around the enclosure bar 160. Each of the fastening mechanisms 140 are fastened to the enclosure bar 160 by a metal pin 360. The lower set of fastening mechanisms 150 is located below the upper fastening mechanisms 140 and comprise a set of metal hooks that hook around the enclosure bar 170. This configuration of fastening mechanisms 140, 150 allow the feeder 10 to be removed from the enclosure bars 160, 170 quickly and easily by removing the two pins from the upper fastening mechanisms 140 and lifting the feeder off of the enclosure bars 160, 170.

In an embodiment, each of the upper fastening mechanisms 140 are attached to the feeder 10 by an elongated member 300, whereby the upper fastening mechanisms 140 are a greater horizontal distance away from the upper corral enclosure bar 160 than the lower fastening mechanisms 150 are away from the lower corral enclosure bar 170. In this configuration, the feeder 10 slopes away from the enclosure from bottom end 40 to the top portion 50. This configuration encourages a feeding animal to feed from a lower portion 310 of the feeder 10 since this is where the feed material is most accessible. Thus, as an animal feeds from the lower portion 310 of the feeder 10, the feed material slowly drops in a downward direction towards the bottom end of the feeder 40.

In a preferred embodiment, the feeder 10 is attached to an enclosure whereby the bottom end 40 is at or near ground level. In this configuration, the lower portion 310 is illustrative of an approximate position that is considered a natural grazing position. A horse therefore can feed in this natural grazing position at or near the lower portion 310, which is near both the bottom end 40 of the feeder 10 and the ground level of the enclosure.

Figure 4:
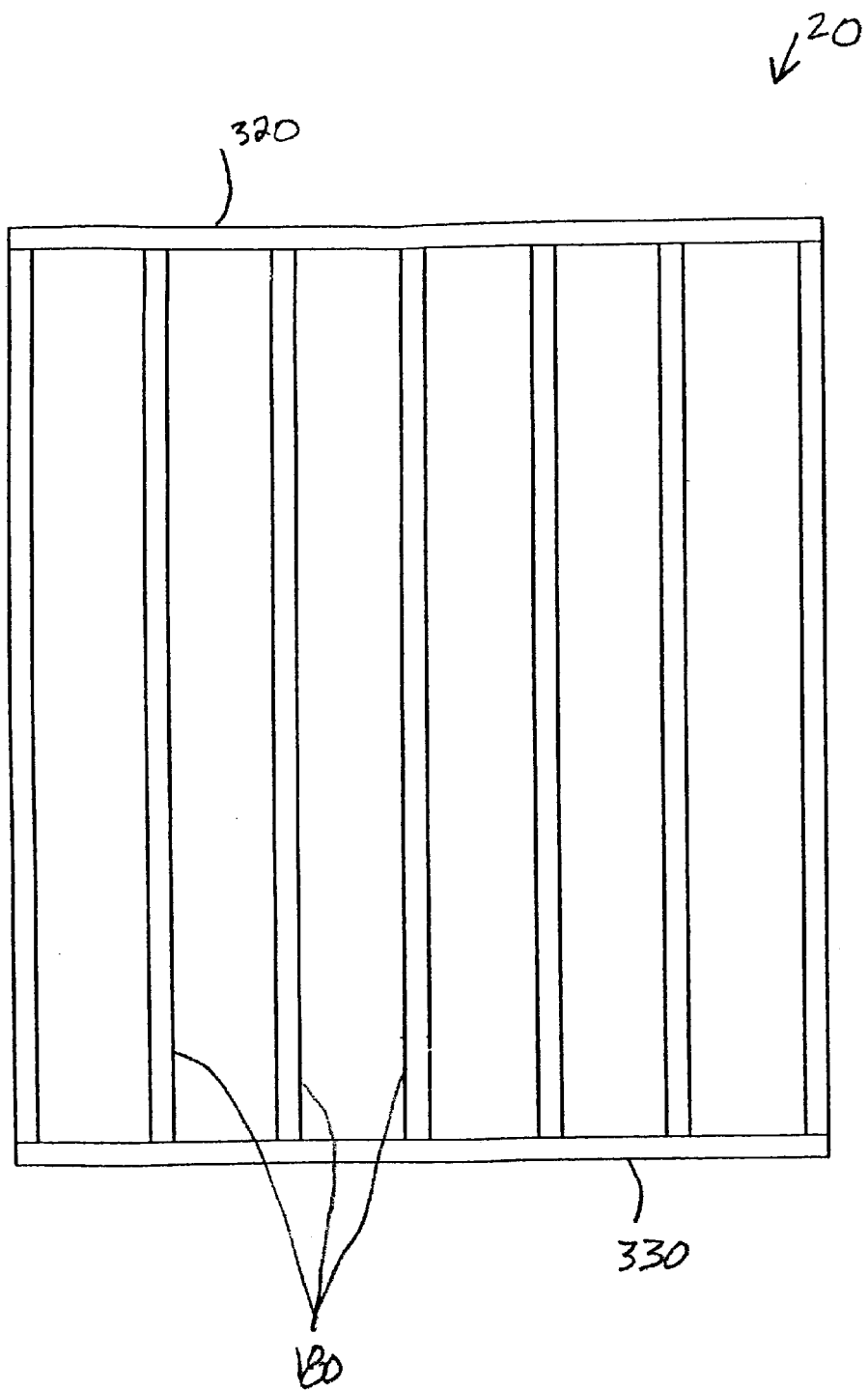
FIG. 4 is a front portion of FIG. 1 without upper and lower fastening mechanisms attached.
Figure 5:
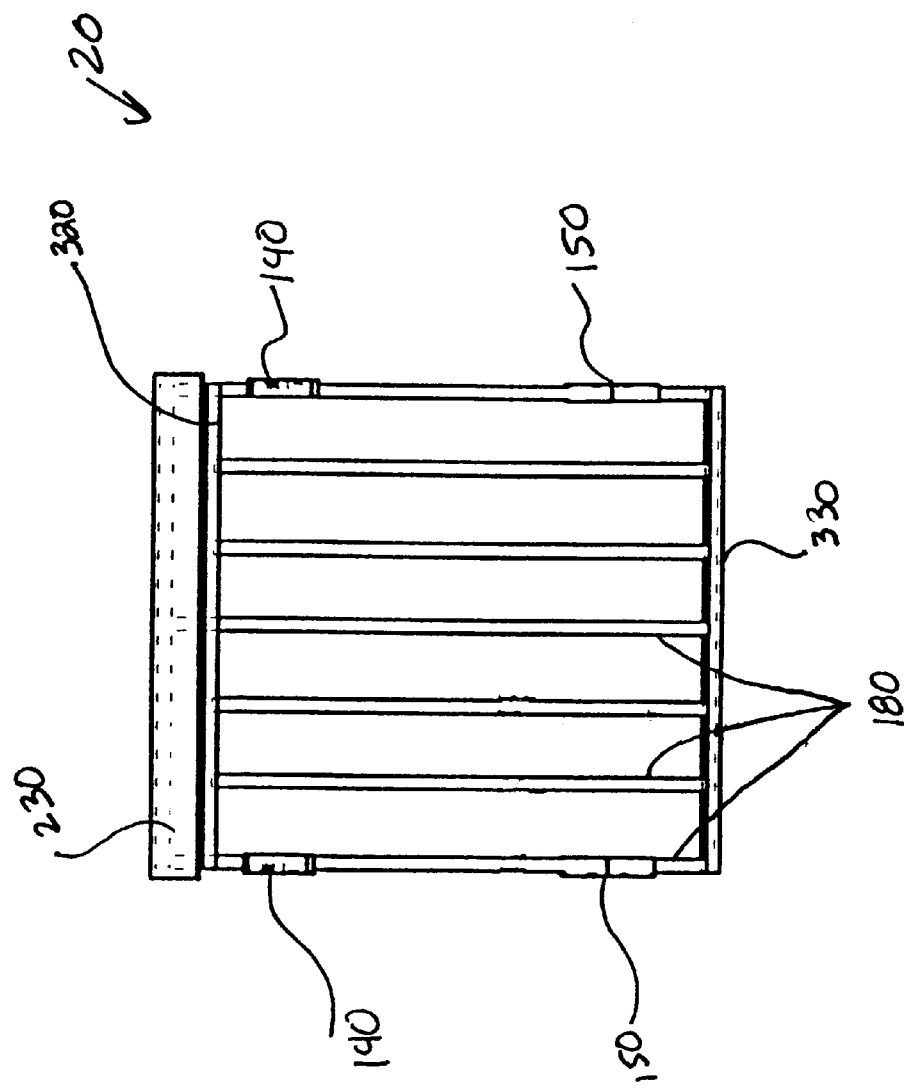
FIG. 5 is a front view of FIG. 1.

Referring to FIGS. 4 and 5, the front portion 20 of the feeder 10 is shown. This front portion 20 comprises a plurality of vertically disposed bars 180 that form a grille. These bars 180 are spaced apart a distance to permit an animal to pull feed material from between the bars 180. Preferably, the bars 180 are spaced apart to allow a horse pull hay from between them. Front portion 20 also comprises upper and lower horizontal members 320, 330 located above and below the vertically disposed bars 180. These horizontal bars 320, 330 hold the bars 180 in place and thus complete the grille of the front portion 20.

Since the fastening mechanisms 140, 150 are located on the front portion 20, the feeder 10 hangs on an outside of an enclosure with the grille facing an inside of the enclosure. This design allows an animal to feed from inside its enclosure while providing convenient access from the outside of the enclosure for removing or refilling the feeder 10.

Figure 6:
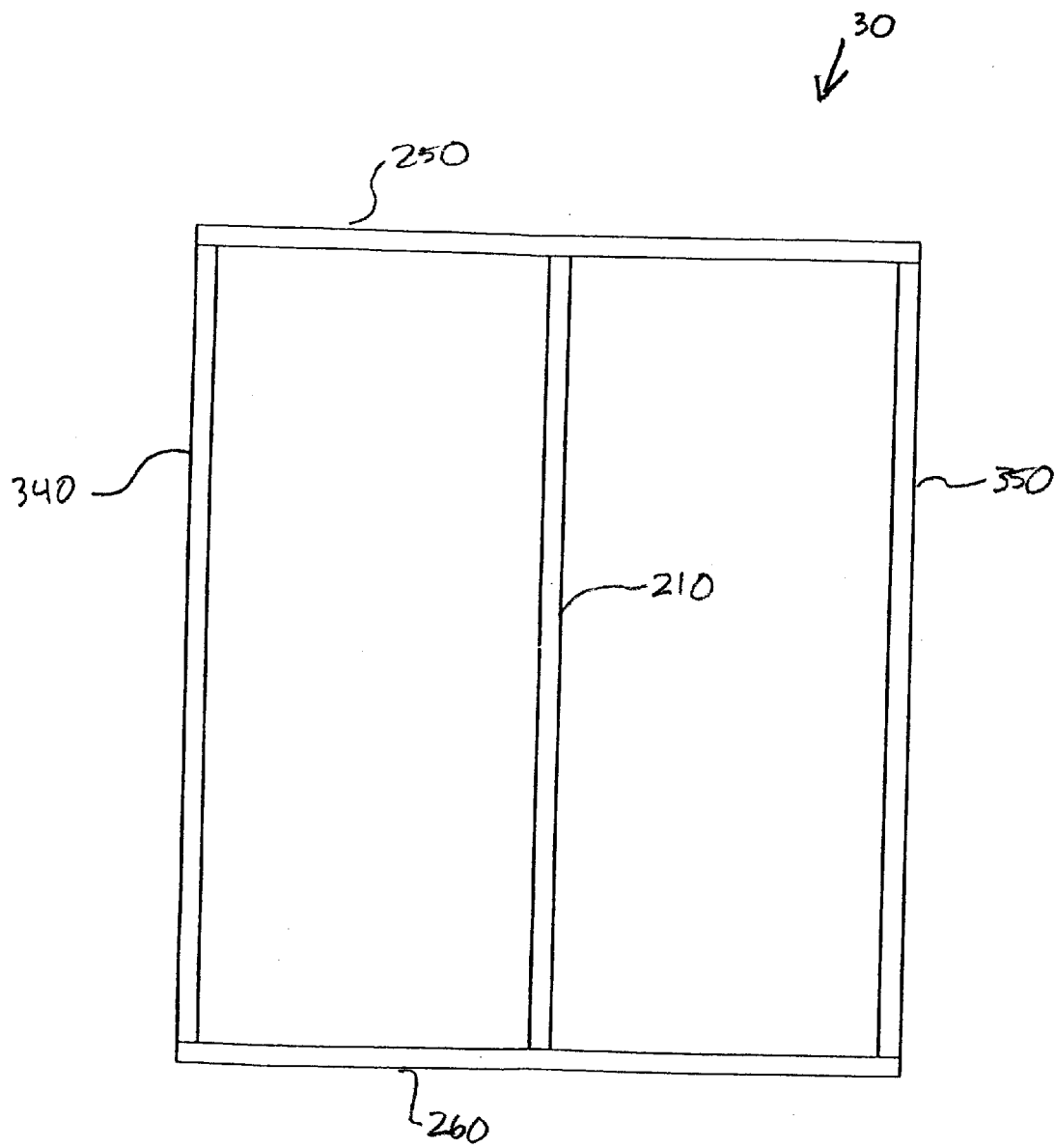
FIG. 6 is a back portion of FIG. 1 without a backing attached.

Referring to FIG. 6, the back portion 30 of the feeder 10 is shown. This back portion 30 comprises left and right vertical members 340, 350 and upper and lower horizontal members 250, 260 that form a rectangular shape defining the back portion. The back portion 30 also comprises a center vertical member 210 that provides structural support for the feeder 10 and an area to fasten a backing 220 to the back portion 30.

Figure 7:
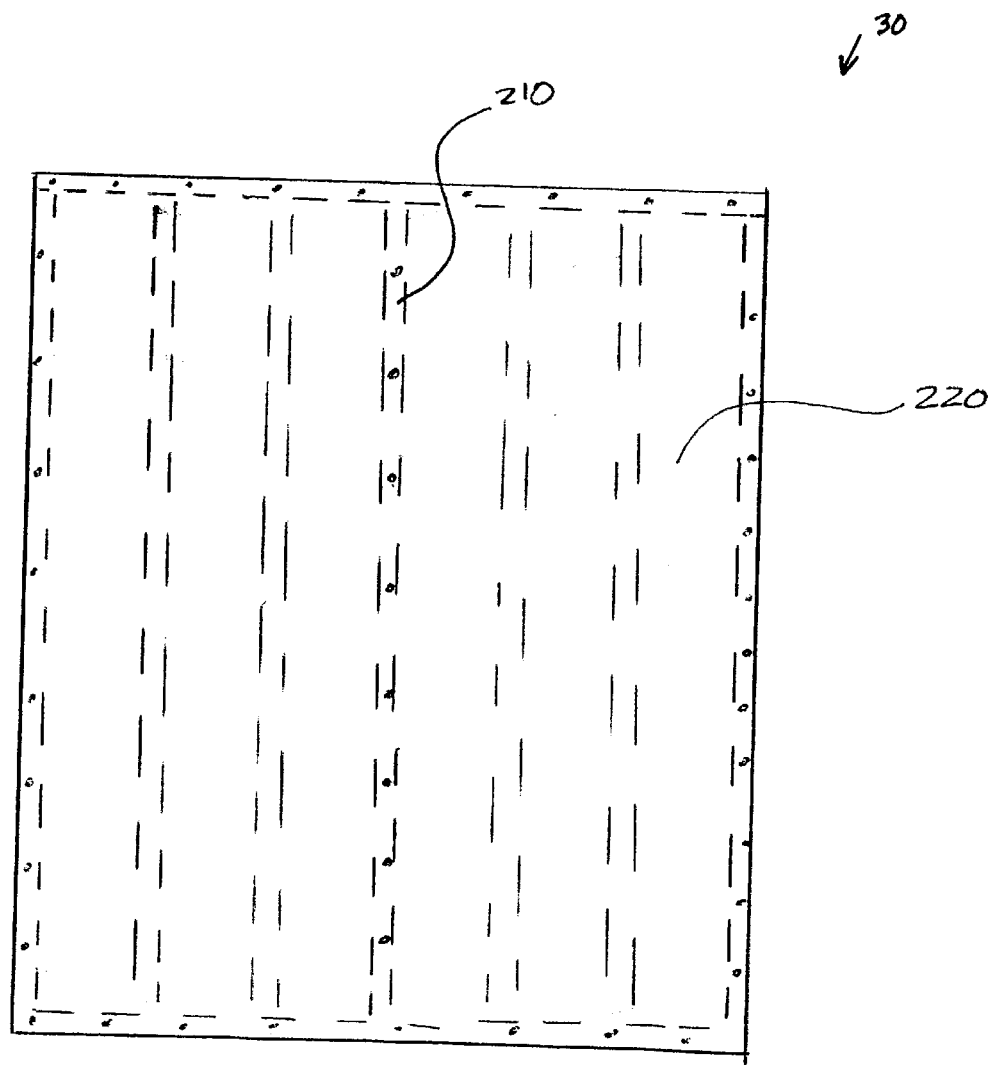
FIG. 7 is a back portion of FIG. 1 with a backing attached.

Referring to FIGS. 7 and 8, the back portion of the feeder 10 is shown with backing 220 attached and front portion 20 in the background. The backing 220 is fastened along an outer perimeter of the back portion 30 and along the vertical member 210. This backing 220 provides support for feed material stored within the feeder 10 and prevents the feed material from escaping.

Referring to FIG. 9, an isometric top view of the feeder 10 is shown with the lid 230 attached. The top portion 50 comprises a lid 230 that is attached with hinges 240 along a top edge 250 of the back portion 30. Alternatively, the hinges 240 can be placed along a top edge 260 of the front portion 20. This lid 230 swings open and provides access to an inside of the feeder 10 while providing protection from outside elements, such as rain, when closed.

The foregoing detailed description of the present invention is illustrative and explanatory. Various changes in the details of the illustrated construction may be made within the scope of the following claims without departing from the spirit of the invention. The present invention should only be limited by the following claims and their legal equivalents.

What is claimed is:

1. A feeder comprising:
   a front face wherein an animal feeds;
   a fastening mechanism extending in from of the from face wherein the feeder is attached to an enclosure; and
   a back portion, wherein the front face and back portion slope apart from each other forming a V shape.

2. The feeder of claim 1, further comprising side portions on either side of the front face, wherein the fastening mechanism is located on the side portions.

3. The feeder of claim 1, wherein the fastening mechanism is located on the front face.

4. The feeder of claim 1, wherein feed material within the feeder is available near ground level.

5. The feeder of claim 1, wherein the feeder is attached to an outside portion of an enclosure.

6. A feeder, comprising:
   a front portion comprising a plurality of bars, wherein the bars are spaced apart a distance to permit an animal to pull feed material from between the bars;
   a back portion comprising a backing whereby feed material is prevented from escaping through the back portion;
   a top portion spanning between the front and back portions comprising an opening whereby feed material is placed inside of the feeder; and
   a fastening mechanism extending in front of the front portion whereby the feeder is fastened to an enclosure.

7. The feeder of claim 6, wherein the front and back portions slope apart from each other such that they diverge so as to funnel feed material in a downward direction.

8. The feeder of claim 6, wherein feed material within the feeder is available near ground level whereby the animal can eat in a natural grazing position.

9. The feeder of claim 6, wherein the top portion further comprises a lid whereby the opening on the top portion is closed.

10. The feeder of claim 9, wherein the fastening mechanism comprises adjustable fasteners.

11. The feeder of claim 10, wherein the adjustable fasteners comprises a pair of hooks and a pair of rounded fasteners, wherein the rounded fasteners are attached to the front portion in a position above the hooks.

12. The feeder of claim 11, wherein the rounded fasteners are attached to the feeder by an elongated member.

13. The feeder of claim 6, wherein the feeder is attached to an outside portion of an enclosure.

14. The feeder of claim 6, further comprising side portions on either side of the feeder, wherein the fastening mechanism is located on the side portions.

15. The feeder of claim 6, wherein the fastening mechanism is located on the front portion.

16. A feeder, comprising:
   a front portion comprising a plurality of bars attached to a substantially straight member, wherein an animal feeds; and
   a fastening means extending in front of the front portion wherein the fastening means extend from an upper portion and a lower portion of the feeder.

17. The feeder of claim 6, wherein the fastening means comprises hooks, rounded fasteners or bar attachments.

18. The feeder of claim 16, wherein the fastening means are located on the front portion.

19. The feeder of claim 16, wherein the fastening means on the upper portion of the feeder are attached to the feeder by an elongated member whereby the upper portion is a further distance away from the enclosure than the lower portion of the feeder.

20. The feeder of claim 16, further comprising side portions on either side of the feeder, wherein the fastening means are located on the side portions.

21. The feeder of claim 16, wherein feed material within the feeder is available near ground level.

22. The feeder of claim 16, wherein the feeder is attached to an outside portion of an enclosure.

* * * * *